United States Patent
Hirose et al.

(10) Patent No.: US 8,995,470 B2
(45) Date of Patent: Mar. 31, 2015

(54) TRANSMITTING DEVICE AND TRANSMITTING METHOD

(75) Inventors: Souichi Hirose, Tokyo (JP); Shinya Kamada, Tokyo (JP)

(73) Assignee: NEC Corporation, Tokyo (JP)

( * ) Notice: Subject to any disclaimer, the term of this patent is extended or adjusted under 35 U.S.C. 154(b) by 38 days.

(21) Appl. No.: 13/636,206

(22) PCT Filed: Mar. 18, 2011

(86) PCT No.: PCT/JP2011/056538
§ 371 (c)(1),
(2), (4) Date: Sep. 20, 2012

(87) PCT Pub. No.: WO2011/118519
PCT Pub. Date: Sep. 29, 2011

(65) Prior Publication Data
US 2013/0010811 A1     Jan. 10, 2013

(30) Foreign Application Priority Data

Mar. 24, 2010   (JP) .................................. 2010-068181

(51) Int. Cl.
*H04J 3/00*       (2006.01)
*H04J 3/16*       (2006.01)
*H04Q 11/04*    (2006.01)

(52) U.S. Cl.
CPC .............. *H04J 3/1647* (2013.01); *H04Q 11/04* (2013.01); *H04Q 2213/13216* (2013.01); *H04Q 2213/13292* (2013.01)
USPC ........................................................ 370/498

(58) Field of Classification Search
None
See application file for complete search history.

(56) References Cited

U.S. PATENT DOCUMENTS

| | | | |
|---|---|---|---|
| 4,287,590 A | * | 9/1981 | Boute et al. ................... 370/374 |
| 6,396,911 B1 | * | 5/2002 | Kostan et al. .............. 379/93.14 |
| 6,628,650 B1 | | 9/2003 | Saito et al. |

(Continued)

FOREIGN PATENT DOCUMENTS

| | | |
|---|---|---|
| JP | 10-032888 | 2/1998 |
| JP | 2000-050374 | 2/2000 |

(Continued)

OTHER PUBLICATIONS

William Stallings, Data and Computer Communications, 3rd Ed., Macmillan Publishing Company, 1991, pp. 186, 193-201.*
International Search Report PCT/JP2011/056538 dated Jun. 28, 2011, with English translation.

*Primary Examiner* — Dang Ton
*Assistant Examiner* — Ronald H Davis
(74) *Attorney, Agent, or Firm* — Young & Thompson

(57) ABSTRACT

A transmitting device is provided which includes a plurality of input interfaces, each of which receives a signal from another device, a plurality of output interfaces, each of which transmits a signal to another device, a multiplexing unit which multiplexes the signals received by the plurality of input interfaces, a distributing unit which transmits the signal multiplexed by the multiplexing unit to each of the plurality of output interfaces, and a table storage unit which stores a switching table in which a transmission destination of each signal is defined. The output interface extracts a signal which the output interface is to transmit according to content of the switching table from each signal included in the signal multiplexed by the multiplexing unit, and transmits the extracted signal to a transfer destination according to the content of the switching table.

13 Claims, 6 Drawing Sheets

(56) References Cited

U.S. PATENT DOCUMENTS

| | | | |
|---|---|---|---|
| 7,002,991 B1 * | 2/2006 | Bolling | 370/468 |
| 7,031,330 B1 * | 4/2006 | Bianchini, Jr. | 370/412 |
| 8,170,416 B2 | 5/2012 | Kai et al. | |
| 2003/0035173 A1 * | 2/2003 | Byers et al. | 359/135 |

| | | | |
|---|---|---|---|
| 2009/0003827 A1 | 1/2009 | Kai et al. | |

FOREIGN PATENT DOCUMENTS

| | | |
|---|---|---|
| JP | 2002-077960 | 3/2002 |
| JP | 2008-306555 | 12/2008 |

* cited by examiner

FIG. 3

| SLOT NO. \ MULTIPLICATION COUNTER VALUE | 1 | 2 | 3 | 4 | ... | N | 1 | 2 | 3 | 4 | ... | N |
|---|---|---|---|---|---|---|---|---|---|---|---|---|
| Slot1 | ○ | | | | | | ○ | | | | | |
| Slot2 | | ○ | | | | | | ○ | | | | |
| Slot3 | | | ○ | | | | | | ○ | | | |
| Slot4 | | | | ○ | | | | | | ○ | | |
| ... | | | | | | | | | | | | |
| SlotN | | | | | | ○ | | | | | | ○ |

TRANSMITTING DEVICE AND TRANSMITTING METHOD

TECHNICAL FIELD

The present invention relates to a technique of performing switching of a signal.

BACKGROUND ART

In the related art, switches (hereinafter referred to as "TSWs") for performing switching in time division multiplexing (TDM) communication have been proposed. In a TSW, the ratio of the number of input slots, the number of slots to be replaced in the TSW, and the number of output slots was 1:1:1. In other words, it was necessary to prepare slots to be replaced in the TSW and internal circuits according thereto which correspond in number to a multiple of the number of input and output slots in a main module that consolidates TDM communication lines.

Further, techniques related to TSWs are disclosed in Patent Document 1 and Patent Document 2. Patent Document 1 discloses a technique of reducing the circuit size such that an output multiplexing circuit sequentially selects outputs from a data memory, multiplexes the outputs, and outputs output multiplexing time division data to an output highway. Further, Patent Document 2 discloses a technique of controlling a multiplicity converting circuit in a digital exchange such that the number of call channels needed by each line interface unit is displayed and read by a control unit.

DOCUMENTS OF THE PRIOR ART

Patent Documents

[Patent Document 1] Japanese Unexamined Patent Application, First Application No. 2002-077960
[Patent Document 2] Japanese Unexamined Patent Application, First Application No. 10-032888

DISCLOSURE OF INVENTION

Problem to be Solved by the Invention

In the TSW of the related art, there was a problem in that when the number of input and output slots increased, the size of the internal circuit increased. For example, when the number of output slots to support is n, internal circuits of the TSW of the main module which correspond in number to the n slots need to be prepared. Thus, with an increase in the number of slots to support, the internal circuits of the main module increase greatly.

In light of the foregoing, it is an object of the present invention to provide a technique capable of preventing the size of hardware from increasing with an increase in the number of input and output slots.

Means for Solving the Problem

According to an aspect of the present invention, a transmitting device is provided which includes a plurality of input interfaces, each of which receives a signal from another device, a plurality of output interfaces, each of which transmits a signal to another device, a multiplexing unit which multiplexes the signals received by the plurality of input interfaces, a distributing unit which transmits the signal multiplexed by the multiplexing unit to each of the plurality of output interfaces, and a table storage unit which stores a switching table in which a transmission destination of each signal is defined, wherein the output interface extracts a signal which the output interface is to transmit according to content of the switching table from each signal included in the signal multiplexed by the multiplexing unit, and transmits the extracted signal to a transfer destination according to content of the switching table.

According to an aspect of the present invention, a transmitting method is provided which is performed by a transmitting device including a plurality of input interfaces, each of which receives a signal from another device, a plurality of output interfaces, each of which transmits a signal to another device, and a table storage unit which stores a switching table in which a transmission destination of each signal is defined, and includes a multiplexing step of, by the transmitting device, multiplexing the signals received by the plurality of input interfaces, a distributing step of, by the transmitting device, transmitting the signal multiplexed in the multiplexing step to each of the plurality of output interfaces, and a transmitting step of, by the transmitting device, extracting a signal which an own output interface is to transmit according to content of the switching table from each signal included in the multiplexed signal in each of the plurality of output interfaces, and transmitting the extracted signal to a transfer destination according to content of the switching table.

Effect of the Invention

According to the present invention, it is possible to prevent the size of hardware from increasing with an increase in the number of input and output slots.

BRIEF DESCRIPTION OF THE DRAWINGS

FIG. 3 is a diagram illustrating a correspondence table of a slot number and a multiplexing multiplication counter value in a transmitting device.

EMBODIMENTS FOR CARRYING OUT THE INVENTION

Figure 1:
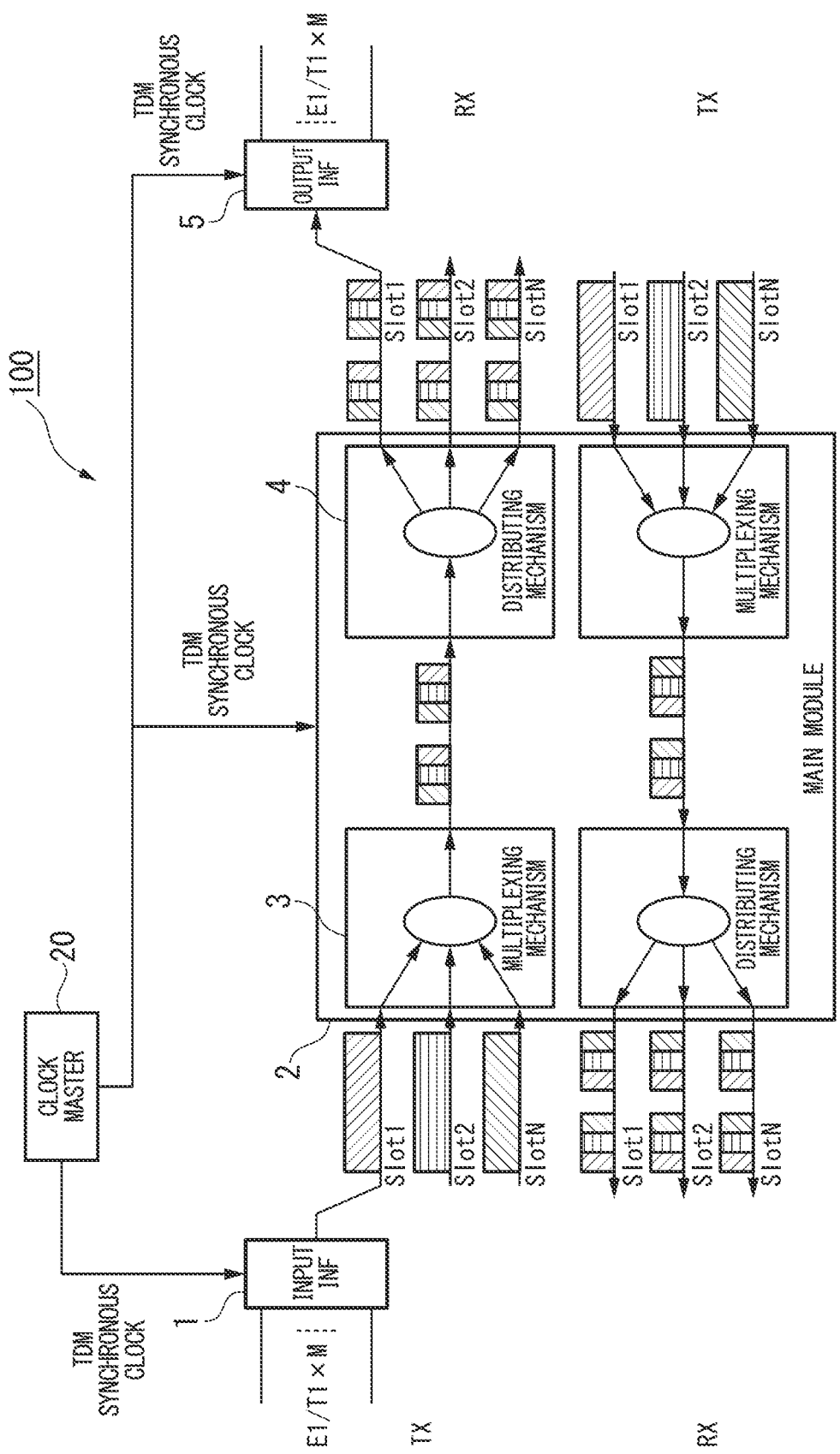
FIG. 1 is a block diagram illustrating a configuration of a transmitting device.

FIG. 1 is a block diagram illustrating a configuration of a transmitting device 100. The transmitting device 100 is a TDM switch that receives a plurality of TDM signals and performs switching. As illustrated in FIG. 1, the transmitting device 100 according to an embodiment includes an input interface (input INF) 1, a main module 2, and an output interface (output INF) 5. Each of the input interface 1, the main module 2, and the output interface 5 receives a TDM synchronous clock from a clock master 20.

FIG. 1 illustrates only one input interface 1, but the input interface 1 is disposed for each slot input to the main module 2. Further, FIG. 1 illustrates only one output interface 5, but the output interface 5 is disposed for each slot output from the main module 2. In other words, when the number of input slots is N, N input interfaces 1 are disposed, and when the number of output slots is N, N output interfaces 5 are disposed. The number of input interfaces 1 may be the same as or different from the number of output interfaces 5. The following description will be made in connection with communication in one direction, but the same operation may be performed even on communication in a reverse direction.

The input interface 1 receives a TDM signal from another device or another circuit. A multiplexing number of the TDM signal input to the input interface 1 is arbitrary. For example, a line format of the TDM signal is an E1 line or a T1 line. The input interface 1 receives M TDM signals, and aggregates the received M TDM signals by TDM. Then, the input interface 1 outputs the generated signal (hereinafter referred to as a "TDM aggregate signal") to the main module 2 in synchronization with the TDM synchronous clock.

The main module 2 includes a set of a multiplexing mechanism 3 and a distributing mechanism 4 for each communication direction. The main module 2 receives the TDM aggregate signal of each slot from a plurality of input interfaces 1. The number of slots supported by the main module 2 is arbitrary, and N slots are assumed to be supported by the main module 2.

Upon receiving the TDM aggregate signal of each slot from the input interface 1, the multiplexing mechanism 3 of the main module 2 generates a TDM-multiplexing signal obtained by multiplexing the TDM aggregate signals of all slots of the same channel based on a multiplication clock multiplied by the TDM synchronous clock. Then, the multiplexing mechanism 3 transmits the generated TDM-multiplexing signal to the distributing mechanism 4. For this reason, a hardware configuration of a transmission path between the multiplexing mechanism 3 and the distributing mechanism 4 is preferably made for a transmission path for transmitting the TDM-multiplexing signal, regardless of the number of input and output slots. In other words, as illustrated in FIG. 1, when a maximum of the number of input slots is N and the TDM aggregate signals corresponding to the N slots are multiplexed and transmitted, the transmission path disposed between the multiplexing mechanism 3 and the distributing mechanism 4 is preferably configured with one transmission path. In FIG. 1, since a transmission path is disposed in a reverse direction, the main module 2 has a total of two transmission paths for transmitting the TDM-multiplexing signal.

The distributing mechanism 4 of the main module 2 receives the TDM-multiplexing signal from the multiplexing mechanism 3, and distributes the received TDM-multiplexing signal to N slots. Thus, the TDM-multiplexing signals flowing between the distributing mechanism 4 and the respective output interfaces 5 are the same as one another in each slot. As described above, the distributing mechanism 4 has a function at least as a distributing unit.

The output interface 5 receives the TDM-multiplexing signal distributed from the distributing mechanism 4. Then, the output interface 5 recognizes each TDM signal from the received TDM-multiplexing signal according to a switching table stored in a table storage unit 14, and extracts the TDM signal corresponding to a slot and a channel allocated to itself. Then, the output interface 5 decides a channel buffer of a frame-converting unit 13 corresponding to a channel used for transmission based on the switching table for the extracted TDM signal, and transmits the TDM signal. A multiplexing number of the TDM signal output from the output interface 5 is arbitrary and is M in FIG. 1.

Figure 2:
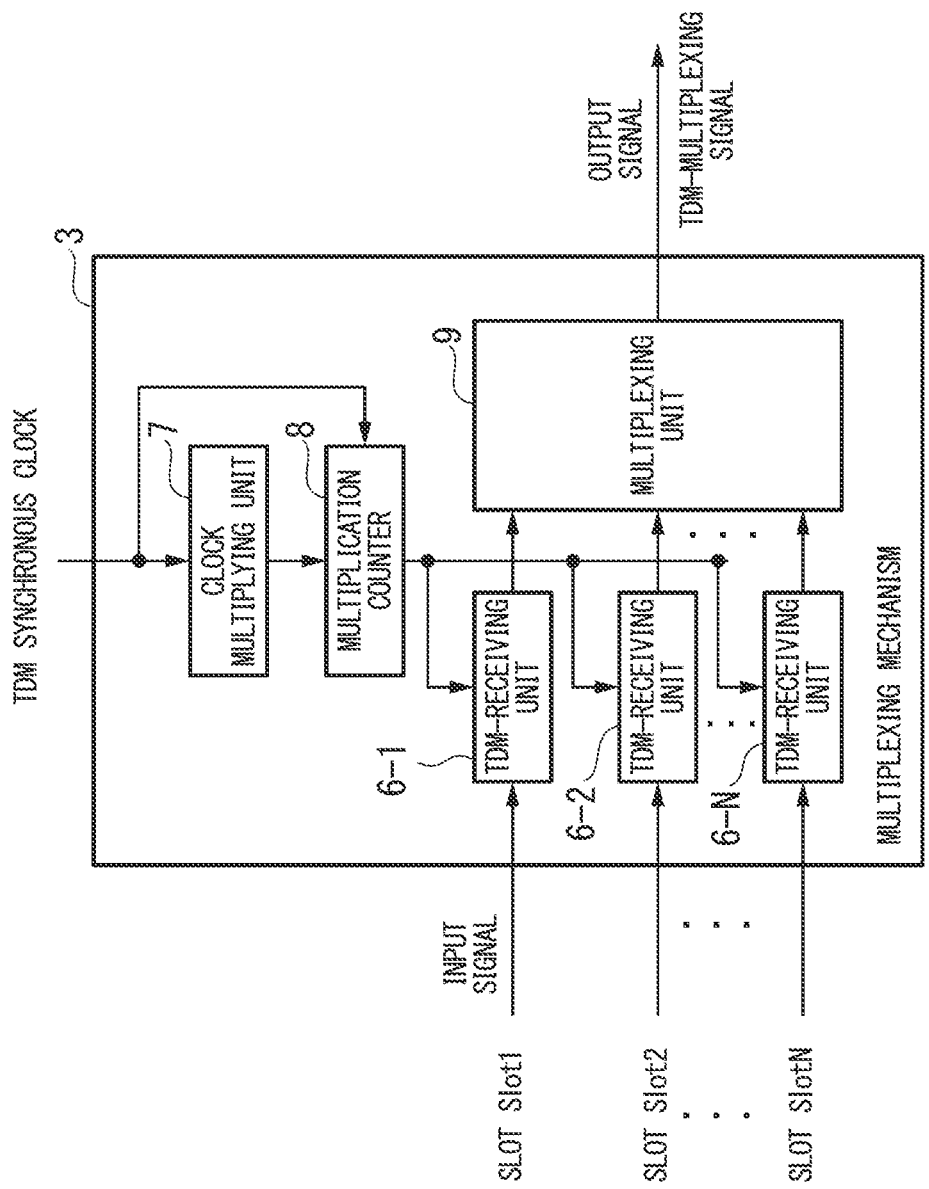
FIG. 2 is a functional block diagram illustrating a functional configuration of a multiplexing mechanism.

FIG. 2 is a functional block diagram illustrating a functional configuration of the multiplexing mechanism 3. The multiplexing mechanism 3 includes TDM-receiving units 6-1 to 6-N which correspond in number to the input slots, a clock-multiplying unit 7, a multiplication counter 8, and a multiplexing unit 9. The clock-multiplying unit 7 and the multiplication counter 8 receive the TDM synchronous clock supplied from the clock master 20.

The clock-multiplying unit 7 multiplies the TDM synchronous clock by a number of (a frequency necessary for switching operation of the TDM signal×the number of slots to multiplex). Hereinafter, a clock multiplied by the clock-multiplying unit 7 is referred to as a "multiplexing multiplication clock." The clock-multiplying unit 7 outputs the multiplexing multiplication clock to the multiplication counter 8. As described above, the clock-multiplying unit 7 has a function at least as a clock unit.

The multiplication counter 8 counts the multiplexing multiplication clock transmitted from the clock-multiplying unit 7 in a loop manner. Specifically, the multiplication counter 8 counts a counter value (hereinafter referred to as a "multiplexing multiplication counter value") from 1 to N, then returns to 1 and repeatedly executes a count as in "1, 2, . . . , N, 1, 2, . . . , N, . . . ." Further, the multiplication counter 8 may have a function of receiving the TDM synchronous clock and correcting the counter value to "1" at the rising edge of the TDM synchronous clock. The multiplication counter 8 outputs the multiplexing multiplication counter value to the TDM-receiving units 6-1 to 6-N. As described above, the multiplication counter 8 has a function at least as a clock counter unit.

Each of the TDM-receiving units 6-1 to 6-N receives the TDM aggregate signal of each slot transmitted from each input interface 1. Further, each of the TDM-receiving units 6-1 to 6-N receives the multiplexing multiplication counter value from the multiplication counter 8. Each of the TDM-receiving units 6-1 to 6-N transmits the received TDM aggregate signal to the multiplexing unit 9 only at a timing of its own slot number based on the multiplexing multiplication counter value received from the multiplication counter 8. At a timing other than a timing of its own slot number, each of the TDM-receiving units 6-1 to 6-N transmits nothing to the multiplexing unit 9, and an output signal is opened.

The multiplexing unit 9 generates the TDM-multiplexing signal by arranging a plurality of TDM aggregate signals sequentially received from the TDM-receiving units 6-1 to 6-N in line along a time axis and thus multiplexing the TDM aggregate signals. Then, the multiplexing unit 9 transmits the TDM-multiplexing signal to the distributing mechanism 4. Further, a transmission path from the multiplexing unit 9 to the distributing mechanism 4 is a transmission path through which the TDM-multiplexing signal is transmitted and thus needs to secure a sufficient band.

FIG. 3 is a diagram illustrating a correspondence table of a slot number (slot no.) and the multiplexing multiplication counter value (which is referred to simply as a "multiplication counter value") in the transmitting device 100. Each of the TDM-receiving units 6-1 to 6-N transmits the TDM aggregate signal of each slot input to itself to the multiplexing unit 9 only at a timing of "O" in the correspondence table illustrated in FIG. 3.

Figure 4:
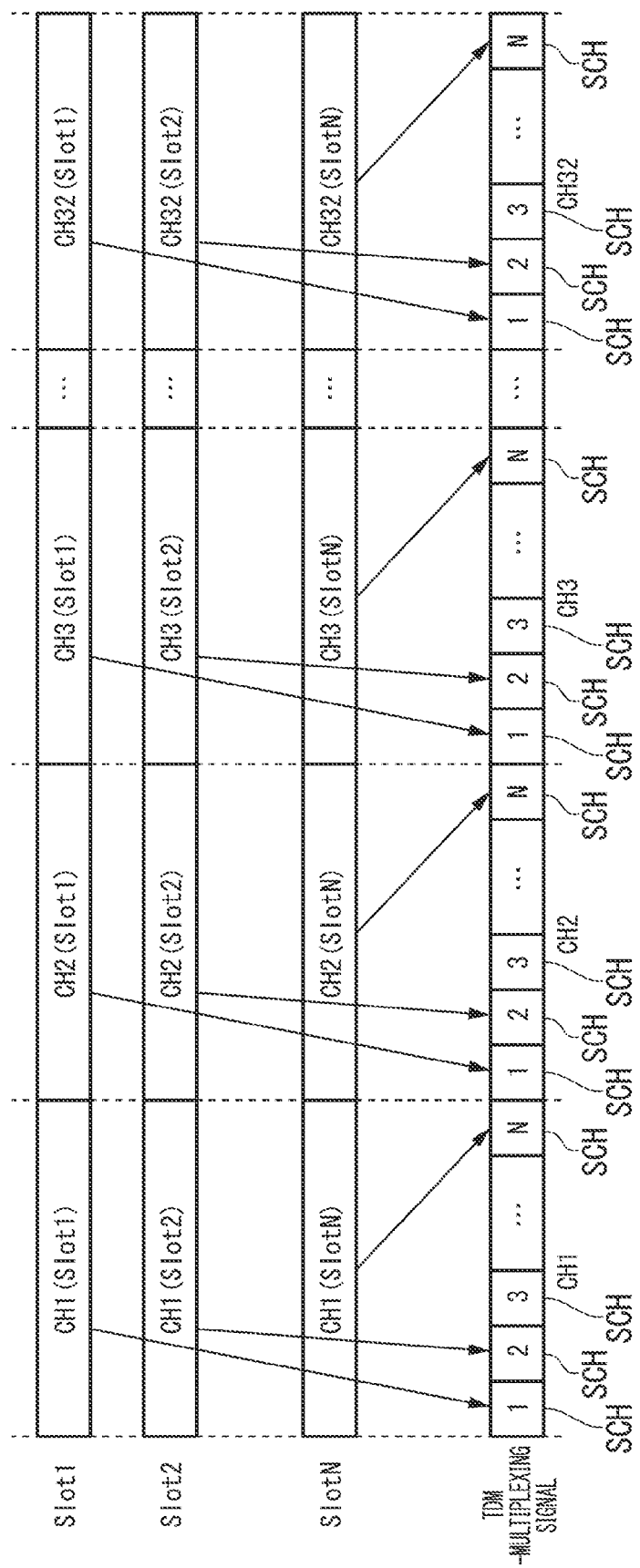
FIG. 4 is a diagram schematically illustrating a TDM-multiplexing signal generated by a multiplexing mechanism.

FIG. 4 is a diagram schematically illustrating the TDM-multiplexing signal generated by the multiplexing mechanism 3. In FIG. 4, a vertical axis denotes a slot number, and a horizontal axis denotes a time. The TDM aggregate signals of a channel corresponding to each timing are input from slots 1 to N to the TDM-receiving units 6-1 to 6-N. For example, at a timing at the leftmost side of FIG. 4, TDM signals of a channel 1 (CH1) are input from slots 1 to N to the TDM-receiving units 6-1 to 6-N. Then, each of the TDM-receiving units 6-1 to 6-N outputs the TDM aggregate signal input from each slot to the multiplexing unit 9 at a predetermined timing according to the multiplexing multiplication counter value.

The multiplexing unit 9 multiplexes the TDM aggregate signals output from the TDM-receiving units 6-1 to 6-N in the same channel in a time direction in order of outputs from the TDM-receiving units 6-1 to 6-N. Through this operation of the multiplexing unit 9, the TDM-multiplexing signal in which the plurality of TDM aggregate signals is multiplexed is generated. For example, the TDM aggregate signals of the channel 1 input from the slots 1 to N are multiplexed by the multiplexing unit 9, so that the TDM-multiplexing signal is generated. A time duration of a channel of the TDM-multiplexing signal is the same as a time duration of a channel of each non-multiplexed TDM aggregate signal. In other words, the multiplexing unit 9 sets sub channels SCH which correspond in number to (the number of channels/the number of slots) to each channel, and allocates the TDM aggregate signal to each sub channel. Thus, a time duration of each of the TDM aggregate signals (a time duration of each sub channel) multiplexed in the TDM-multiplexing signal is smaller than a time duration of each of the TDM aggregate signals input to the TDM-receiving units 6-1 to 6-N, and specifically, it is almost 1/N. An interval between the neighboring sub channels SCH may be set not to incur a gap or may be set to a predetermined width.

When the multiplexing multiplication counter value is "1," the TDM aggregate signal of the slot 1 is input from the TDM-receiving unit 6-1 to the multiplexing unit 9. The multiplexing unit 9 arranges this TDM aggregate signal in the sub channel SCH1. When the multiplexing multiplication counter value is "2," the TDM aggregate signal of the slot 2 is input from the TDM-receiving unit 6-2 to the multiplexing unit 9. The multiplexing unit 9 arranges this TDM aggregate signal in the sub channel SCH2. Then, until the multiplexing multiplication counter value proceeds by one cycle, this process is repeated, so that the TDM-multiplexing signal is generated. Then, when the multiplexing multiplication counter value is "N," the TDM aggregate signal of the slot N is input from the TDM-receiving unit 6-N to the multiplexing unit 9. The multiplexing unit 9 arranges this TDM aggregate signal in the sub channel SCHN, so that the TDM-multiplexing signal of one channel is generated.

Further, the multiplexing unit 9 multiplexes the TDM aggregate signals output from the TDM-receiving unit 6, and outputs the multiplexed signal to the distributing mechanism 4. At this time, the transmission path from the multiplexing unit 9 needs to secure a sufficient band because the TDM aggregate signals have been multiplexed. Further, since a multiplex frame format of an E1 line is illustrated herein, the number of channels is 32, but in case of a T1 line, the number of channels is 24.

Figure 5:
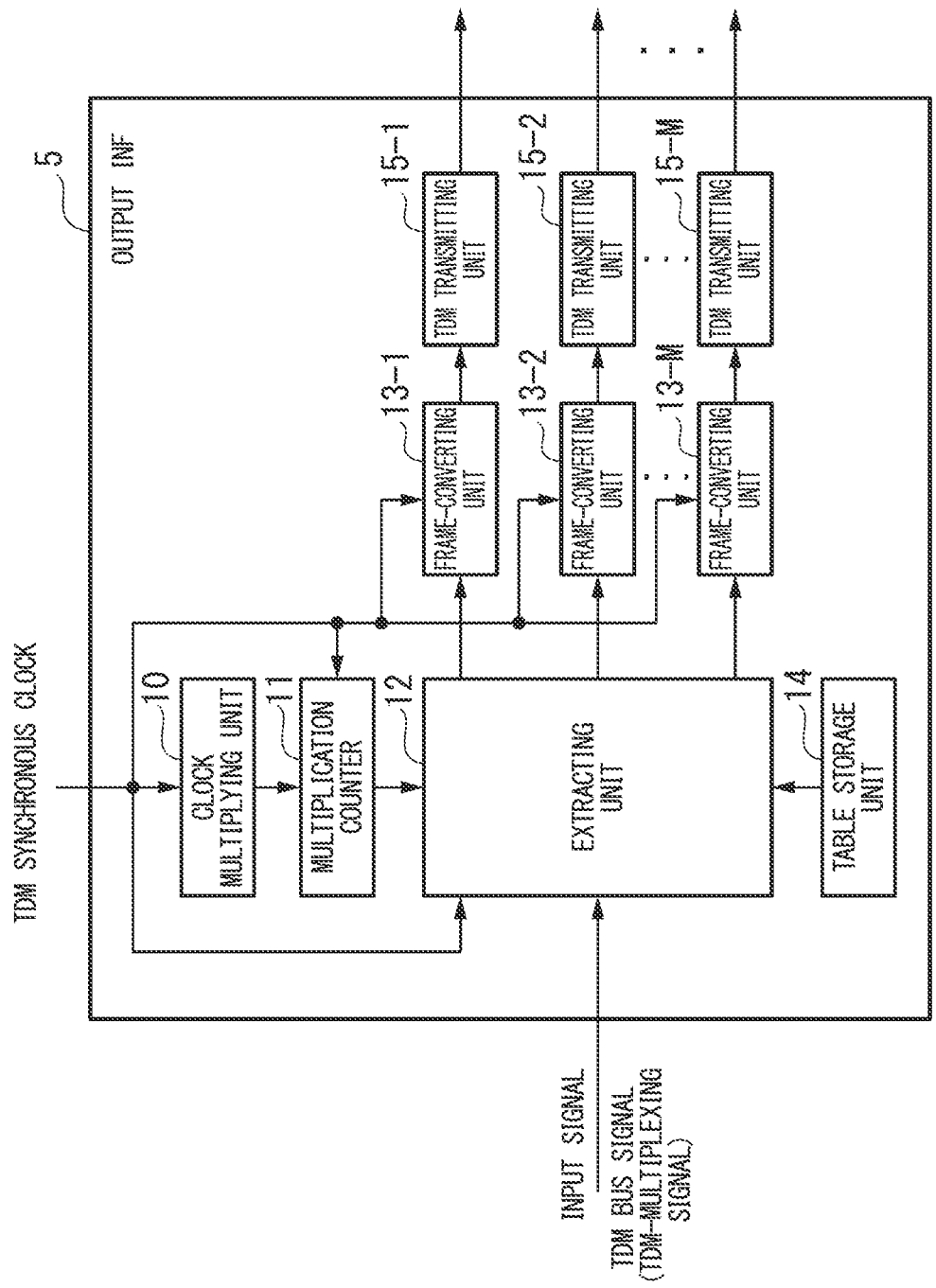
FIG. 5 is a functional block diagram illustrating a functional configuration of an output interface.

FIG. 5 is a functional block diagram illustrating a functional configuration of the output interface 5. The output interface 5 includes a clock-multiplying unit 10, a multiplication counter 11, an extracting unit 12, frame-converting units 13-1 to 13-M and TDM-transmitting units 15-1 to 15-M which correspond in number to the TDM signals to be output, and a table storage unit 14. Each of the clock-multiplying unit 10, the multiplication counter 11, the extracting unit 12, and the frame-converting units 13-1 to 13-M receives the TDM synchronous clock supplied from the clock master 20.

The clock-multiplying unit 10 multiplies the TDM synchronous clock by a number of (a frequency necessary for switching operation of the TDM signal×the number of slots to multiplex). Hereinafter, a clock multiplied by the clock-multiplying unit 10 is referred to as a "distribution multiplication clock." The clock-multiplying unit 7 outputs the distribution multiplication clock to the multiplication counter 11.

The multiplication counter 11 counts the distribution multiplication clock transmitted from the clock-multiplying unit 10 in a loop manner. Specifically, the multiplication counter 11 counts a counter value (hereinafter referred to as a "distribution multiplication counter value") from 1 to N, then returns to 1 and repeatedly executes a count as in "1, 2, . . . , N, 1, 2, . . . , N, . . . ." Further, the multiplication counter 11 may have a function of receiving the TDM synchronous clock and correcting the counter value to "1" at the rising edge of the TDM synchronous clock. The multiplication counter 11 outputs the distribution multiplication counter value to the extracting unit 12.

The table storage unit 14 stores a switching table. Content of the switching table stored in the table storage unit 14 is read by the extracting unit 12. The switching table refers to switching information related to the TDM aggregate signal input from a slot at each input side. Specifically, the switching table is a table in which, for example, a slot number and a channel number are associated with the frame-converting unit 13. Further, the table storage unit 14 included in the output interface 5 of each slot is configured to have only information corresponding to its own slot. For example, the table storage unit 14 of the output interface 5 connected to the slot 1 stores only information related to the slot 1.

The extracting unit 12 receives the TDM-multiplexing signal transmitted from the multiplexing mechanism 3 via the distributing mechanism 4, and extracts only the TDM aggregate signal corresponding to its own slot among the multiplexed TDM aggregate signals. The extracting unit 12 generates M TDM signals by untying an aggregate of the extracted TDM aggregate signal. Then, the extracting unit 12 outputs each of the M TDM signals to a corresponding one of the corresponding frame-converting units 13-1 to 13-M.

Specifically, the extracting unit 12 reads content of the switching table stored in the table storage unit 14 in advance. The extracting unit 12 receives the distribution multiplication counter value from the multiplication counter 11, and determines a slot number of the TDM aggregate signal included in the sub channel SCH of the TDM-multiplexing signal received from the multiplexing mechanism 3, at the same timing, based on the received distribution multiplication counter value. Further, the extracting unit 12 receives the TDM synchronous clock from the clock master 20, and determines a channel number of the TDM-multiplexing signal received from the multiplexing mechanism 3, at the same timing, based on the received TDM synchronous clock. Specifically, the determination on the channel number is performed based on a time (the number of seconds) elapsed from a timing when the TDM synchronous clock is received by the extracting unit 12 to a timing when the TDM-multiplexing signal is received. The extracting unit 12 compares the slot number and the channel number, which are the determination result, with the switching table of the table storage unit 14, and determines the frame-converting unit 13 corresponding to a channel used for transmission. Then, the extracting unit 12 transmits the extracted TDM signal to the channel buffer of the frame-converting unit 13 corresponding to the determination result.

The frame-converting units 13-1 to 13-M are disposed according to the number of TDM signals at an output side. Each of the frame-converting units 13-1 to 13-M includes at least one buffer (channel buffer) for storing the TDM signal to be output. Each of the frame-converting units 13-1 to 13-M receives the TDM signal from the extracting unit 12, and temporarily stores the TDM signal in the channel buffer.

Then, each of the frame-converting units 13-1 to 13-M transmits the TDM signal accumulated in the channel buffer to one of the TDM-transmitting units 15-1 to 15-M corresponding to itself according to the TDM synchronous clock. At a point in time when each TDM signal is received in each of the frame-converting units 13-1 to 13-M, a time duration of each TDM signal is a time duration (a time duration of 1 channel/(N×M)) obtained by further dividing the time duration of the sub channel SCH by M. However, when each TDM signal is transmitted from each of the frame-converting units 13-1 to 13-M, the time duration of each TDM signal is converted to the time duration of 1 channel by each of the frame-converting units 13-1 to 13-M.

Each of the TDM-transmitting units 15-1 to 15-M receives the TDM signal from one of the frame-converting units 13-1 to 13-M corresponding to itself, and transmits the TDM signal to a corresponding device.

According to the transmitting device 100, a plurality of TDM aggregate signals are multiplexed in the same channel as sub channels, and input to the extracting unit 12. Then, the extracting unit 12 extracts the TDM aggregate signal multiplexed in each sub channel and unties the aggregation, and then the TDM signal is transmitted from the corresponding frame-converting unit 13. Thus, even when the number of slots increases, an increase in the circuit size can be prevented. In other words, in the related art, the ratio of the number of input slots, the number of slots to be replaced in the TSW, and the number of output slots was 1:1:1. However, in the transmitting device 100, when the number of input and output slots increases to n, the ratio of n:1:n can be implemented.

Further, through this configuration, the circuit size of the main module 2 can be substantially reduced. In addition, the number of necessary slots can be supported by changing (adding or deleting) the number of input interfaces 1 and output interfaces 5 without changing hardware of the main module 2. Thus, it is unnecessary to dispose hardware to support unnecessarily many slots in the main module 2 in advance, and the transmitting device 100 having the number of slots according to needs can be provided at a low cost.

(Modified Embodiment)

In the above embodiment, a signal input to the input interface 1 and a signal output from the output interface 5 are the TDM signals, but neither a signal input to the input interface 1 nor a signal output from the output interface 5 is limited to the TDM signal, and both may be different signals. In this case, an input of the TDM synchronous clock to the input interface 1 and the output interface 5 may be appropriately omitted.

Further, in the above embodiment, the multiplexing mechanism 3 multiplexes the TDM aggregate signal corresponding to N slots in one channel. However, the multiplexing mechanism 3 may be configured to multiplex the TDM aggregate signal corresponding to N slots in a plurality of channels which are smaller in number than N.

For example, the multiplexing mechanism 3 may be configured to multiplex the TDM aggregate signals corresponding to N/2 slots in one channel and set two transmission paths of the TDM-multiplexing signals between the multiplexing mechanism 3 and the distributing mechanism 4. In this case, two multiplexing units 9 are disposed in the multiplexing mechanism 3. For example, the TDM aggregate signals of slots 1 to N/2 are input to one multiplexing unit 9, and the TDM aggregate signals of the remaining slots are input to the other multiplexing unit 9. Even in the distributing mechanism 4, two receiving units that receive the TDM-multiplexing signals are disposed, and the TDM-multiplexing signals are transmitted to the corresponding output interfaces 5.

Figure 6:
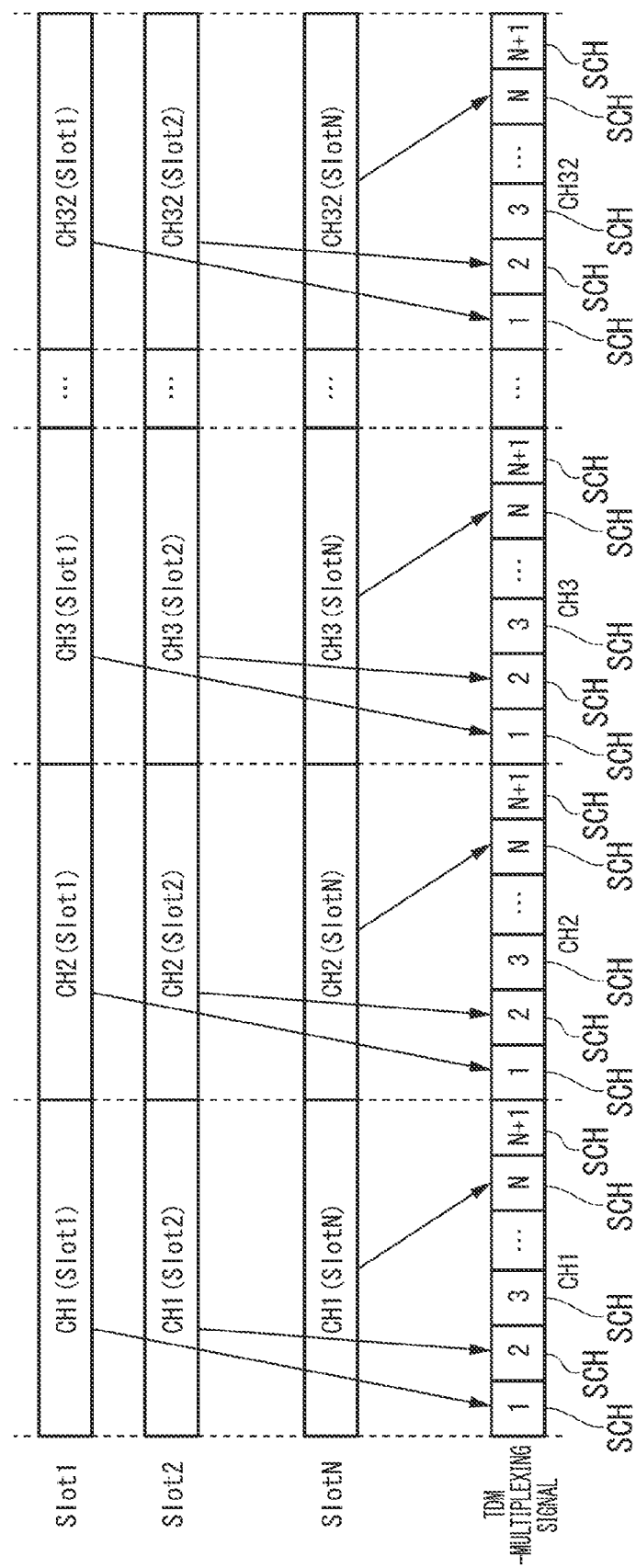
FIG. 6 is a diagram schematically illustrating a modified embodiment of a TDM-multiplexing signal generated by a multiplexing mechanism.

Further, sub channels SCH which are larger in number than the slots may be set to the TDM-multiplexing signal. FIG. 6 is a diagram schematically illustrating a modified embodiment of the TDM-multiplexing signal generated by the multiplexing mechanism 3. In the TDM-multiplexing signal illustrated in FIG. 6, when the number of slots at an input side and an output side is N, the number of sub channels SCH set to one channel is N+1. Thus, a signal including information different from the TDM signal input from a slot may be arranged in a sub channel SCH(N+1) of the TDM-multiplexing signal. Thus, the multiplexing unit 9 according to the modified embodiment arranges information representing a state of a line or a network, information related to the occurrence of a failure, or any other predetermined information in the sub channel SCH(N+1). In this case, the extracting unit 12 of the output interface 5 extracts information from the sub channel SCH(N+1) and then transmits the extracted information to a predetermined output destination.

The embodiments of the present invention have been described in detail so far with reference to the accompanying drawings, but a concrete configuration is not limited to the above embodiments and may include a design of a range not departing from the gist of the present invention or the like.

Priority is claimed on Japanese Patent Application No. 2010-068181, filed Mar. 24, 2010, the contents of which are incorporated herein by reference.

INDUSTRIAL APPLICABILITY

The present invention can be applied to a transmitting device including a plurality of input interfaces and a plurality of output interfaces.

REFERENCE SYMBOLS

1: Input interface
2: Main module
3: Multiplexing mechanism
4: Distributing mechanism
5: Output interface
6-1 to 6-N: 1DM-receiving unit
7: Clock-multiplying unit (clock unit)
8: Multiplication counter
9: Multiplexing unit
10: Clock-multiplying unit (clock unit)
11: Multiplication counter (clock counter unit)
12: Extracting unit
13-1 to 13-N: Frame-converting unit
14: Table storage unit
15: TDM transmitting unit
20: Clock master

The invention claimed is:
1. A transmitting device, comprising:
a plurality of input interfaces, each of which receives a time division multiplexing (TDM) signal from another device;
a plurality of output interfaces, each of which transmits a TDM signal to another device;
a multiplexing unit which generates a TDM aggregate signal by performing multiplexing by TDM the TDM signals received by the plurality of input interfaces;
a distributing unit which transmits the TDM aggregate signal generated by the multiplexing unit to each of the plurality of output interfaces;

a TDM transmission path which transmits the TDM aggregate signal generated by the multiplexing unit to the distributing unit; and a table storage unit which stores a switching table in which a transmission destination of each TDM signal is defined, wherein the output interface extracts a TDM signal that the output interface is to transmit according to content of the switching table from each TDM signal included in the TDM aggregate signal generated by the multiplexing unit, and transmits the extracted TDM signal to a transfer destination according to the content of the switching table, and the multiplexing unit performs multiplexing by setting sub channels which are equal to more in number than the input interfaces to one channel, and arranging the TDM signal received by each input interface in each sub channel.

2. The transmitting device according to claim 1, further comprising:

a clock unit which generates a clock that swings multiple times during a time corresponding to one channel; and a clock counter unit which repeatedly counts the number of oscillations of the clock generated by the clock unit for each channel, wherein the multiplexing unit decides a multiplexing timing of the signal received by each input interface according to a counter result by the clock counter unit, and the output interface determines the input interface which has received the multiplexed signal according to the counter result by the clock counter unit, and decides a transfer destination of each TDM signal according to a determination result and the content of the switching table.

3. The transmitting device according to claim 1, wherein the multiplexing unit further multiplexes other control information in addition to the TDM signals received by all input interfaces.

4. A transmitting method performed by a transmitting device including a plurality of input interfaces, each of which receives a time division multiplexing (TDM) signal from another device, a plurality of output interfaces, each of which transmits a TDM signal to another device, and a table storage unit which stores a switching table in which a transmission destination of each TDM signal is defined, the method comprising:

a multiplexing step of, by the transmitting device, multiplexing the TDM signals received by the plurality of input interfaces, the multiplexing being performed by setting sub channels which are equal to more in number than the input interfaces to one channel, and arranging the TDM signal received by each input interface in each sub channel;

a distributing step of, by the transmitting device, transmitting the TDM aggregate signal generated in the multiplexing step to each of the plurality of output interfaces;

a transmitting step of, by the transmitting device, transmitting the TDM aggregate signal generated by the multiplexing step to the distributing step;

an extracting step of extracting the TDM aggregate signal which an own output interface is to transmit according to content of the switching table from each TDM signal included in the aggregate signal in each of the plurality of output interfaces; and a transmitting step of transmitting the extracted TDM signal to a transfer destination according to the content of the switching table.

5. The transmitting device according to claim 2, wherein the multiplexing unit further multiplexes other control information in addition to the TDM signals received by all input interfaces.

6. The transmitting device according to claim 1, wherein a time duration of each sub channel is smaller than a time duration of each TDM aggregate signal input.

7. The transmitting device according to claim 1, wherein a time duration of each sub channel is almost 1/N, where N is a number of receiving units.

8. The transmitting device according to claim 1, wherein an interval between neighboring sub channels is set not to incur a gap or is set to a predetermined width.

9. The method according to claim 4, wherein a time duration of each sub channel is smaller than a time duration of each TDM aggregate signal input.

10. The method according to claim 4, wherein a time duration of each sub channel is almost 1/N, where N is a number of receiving units.

11. The method according to claim 4, wherein an interval between neighboring sub channels is set not to incur a gap or is set to a predetermined width.

12. The method according to claim 4, further comprising:

generating a clock that swings multiple times during a time corresponding to one channel;

repeatedly counting a number of oscillations of the clock for each channel;

deciding a multiplexing timing of the TDM signal received by each input interface according to a counter;

determining the input interface which has received the TDM aggregate signal according to a counter; and deciding a transfer destination of each TDM signal according to a determination result and a content of the switching table.

13. The method according to claim 4, further comprising:

further multiplexing other control information in addition to the TDM signals received by all input interfaces.

* * * * *